(12) United States Patent
Dunkley-Davis (10) Patent No.: US 9,622,396 B1
(45) Date of Patent: Apr. 18, 2017

(54) FOLDING CAR SHOVEL AND ASSOCIATED USE THEREOF

(71) Applicant: Grace Dunkley-Davis, Rosedale, NY (US)

(72) Inventor: Grace Dunkley-Davis, Rosedale, NY (US)

( * ) Notice: Subject to any disclaimer, the term of this patent is extended or adjusted under 35 U.S.C. 154(b) by 0 days.

(21) Appl. No.: 15/216,359

(22) Filed: Jul. 21, 2016

Related U.S. Application Data (60) Provisional application No. 62/194,947, filed on Jul. 21, 2015.

(51) Int. Cl.
| | | |
|---|---|---|
| *A01B 1/00* | (2006.01) | |
| *A01D 9/00* | (2006.01) | |
| *A01D 11/00* | (2006.01) | |
| *A01B 1/02* | (2006.01) | |
| *E01H 5/02* | (2006.01) | |
| *E01H 10/00* | (2006.01) | |

(52) U.S. Cl.
CPC ............... *A01B 1/022* (2013.01); *E01H 5/02* (2013.01); *E01H 10/00* (2013.01)

(58) Field of Classification Search
CPC ........... A01B 1/022; A01B 1/02; A01B 1/225; A01B 1/16; E01H 10/00; E01H 5/02; A47J 43/283; F24B 15/10; B25G 3/02; B25G 3/32; B25D 3/00; A47L 13/08; B44D 3/162; B26B 9/02; B26B 9/00

See application file for complete search history.

(56) References Cited

U.S. PATENT DOCUMENTS

| | | | | |
|---|---|---|---|---|
| D395,211 S | * | 6/1998 | Linden | ............................. D8/10 |
| 6,746,062 B2 | * | 6/2004 | Bielecki | ................ A47J 43/288 |
| | | | | 16/422 |
| 8,002,322 B2 | * | 8/2011 | Rathmell | ............... A63B 29/08 |
| | | | | 254/131 |
| 2005/0212315 A1 | * | 9/2005 | Jean | ....................... A01B 1/022 |
| | | | | 294/51 |
| 2008/0276396 A1 | * | 11/2008 | Lucero | ................. A46B 5/0083 |
| | | | | 15/144.2 |

* cited by examiner

*Primary Examiner* — Stephen Vu (57) ABSTRACT

A multi-functional folding shovel for assisting a user to regain traction under vehicle wheels includes a bifurcated body having a centrally registered longitudinal axis extended along an entire length thereof. Such a bifurcated body includes a proximal end and a distal end opposed therefrom. A coupling is intermediately disposed between the proximal end and the distal end wherein the coupling has a fulcrum axis registered orthogonal to the centrally registered longitudinal axis. Advantageously, a refillable reservoir is extended from the proximal end and affixed to the coupling. In this manner refillable reservoir is adapted to receive and discharge an existing friction-inducing agent therefrom. An implement having an adjustable shape is affixed to the coupling and extended to the distal end wherein the implement is selectively articulated about the fulcrum axis relative to the refillable reservoir.

10 Claims, 6 Drawing Sheets

FOLDING CAR SHOVEL AND ASSOCIATED USE THEREOF

CROSS REFERENCE TO RELATED APPLICATIONS

This is a non-provisional patent application that claims the benefit of U.S. provisional patent application No. 62/194,947 filed Jul. 21, 2015, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to multi-functional shovels and, more particularly, to a tough and durable folding shovel including a refillable reservoir or compartment that will supply the user with high-traction sand or cat-litter that may be placed beneath and in front of the drive-wheels of the vehicle in order to regain traction thereby providing a reliable, economical means to quickly free the vehicle when stuck.

Prior Art

Millions of motorists find their vehicles stuck in ice and snow across the country each year? What if you could offer those millions of stranded motorists a simple, effective, and affordable means to free a car, van, pick-up or SUV when it did become stuck, incapable of traction, in icy, snowy (or muddy) conditions?

Accordingly, a need remains for a tough and durable folding shovel in order to overcome at least one above-mentioned shortcoming. The exemplary embodiment(s) satisfy such a need by providing a tough and durable folding shovel including a refillable reservoir or compartment that will supply the user with high-traction sand or cat-litter that may be placed beneath and in front of the drive-wheels of the vehicle in order to regain traction that is convenient and easy to use, lightweight yet durable in design, versatile in its applications, and designed for providing a reliable, economical means to quickly free the vehicle when stuck.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a multi-functional folding shovel for assisting a user to regain traction under vehicle wheels. These and other objects, features, and advantages of the non-limiting exemplary embodiment(s) are provided by a multi-functional folding shovel including a bifurcated body having a centrally registered longitudinal axis extended along an entire length thereof. Such a bifurcated body includes a proximal end and a distal end opposed therefrom. A coupling is intermediately disposed between the proximal end and the distal end wherein the coupling has a fulcrum axis registered orthogonal to the centrally registered longitudinal axis.

Advantageously, a refillable reservoir is extended from the proximal end and affixed to the coupling. In this manner refillable reservoir is adapted to receive and discharge an existing friction-inducing agent therefrom. An implement having an adjustable shape is affixed to the coupling and extended to the distal end wherein the implement is selectively articulated about the fulcrum axis relative to the refillable reservoir.

In a non-limiting exemplary embodiment, the refillable reservoir includes a hollow tube including a generally d-shaped handle portion located at the proximal end of the bifurcated body. A rectilinear portion is in fluid communication with the handle portion. Notably, the rectilinear portion is axially aligned with the centrally registered longitudinal axis and engaged with the coupling. At least one end cap is removably mated to the handle portion for providing access to the existing friction-inducing agent.

In a non-limiting exemplary embodiment, the coupling includes a hinge including a first portion directly and statically connected to the rectilinear portion. A second portion is directly and statically connected to the implement. In this manner, the implement is selectively articulated along an arcuate path about the fulcrum axis such that the implement is disposed substantially parallel to the refillable reservoir when biased to a folded position as well as an unfolded position.

In a non-limiting exemplary embodiment, the implement includes a shovel.

In a non-limiting exemplary embodiment, the generally d-shaped handle portion includes a first open port and a second open port axially opposed therefrom.

In a non-limiting exemplary embodiment, the at least one end cap includes a first end cap and a second end cap detachably mated to the first open port and the second open port, respectively.

In a non-limiting exemplary embodiment, the shovel includes a blade located at the distal end of the body. Such a blade advantageously includes a central section aligned with the centrally registered longitudinal axis. A pair of coextensively shaped flanges are pivotally connected to opposed lateral sides of the central section. In this manner, each of the coextensively shaped flanges are equidistantly offset from the centrally registered longitudinal axis. Notably, the coextensively shaped flanges are articulated along mutually exclusive and non-overlapping travel paths.

The present disclosure further includes a method of utilizing a multi-functional folding shovel for assisting a user to regain traction under vehicle wheels. Such a method includes the steps of: providing a bifurcated body having a centrally registered longitudinal axis 12 extended along an entire length thereof as well as a proximal end and a distal end opposed therefrom, by performing the sub-steps of: providing and intermediately disposing a coupling between the proximal end and the distal end wherein the coupling has a fulcrum axis registered orthogonal to the centrally registered longitudinal axis; and providing and extending a refillable reservoir from the proximal end such that the refillable reservoir is affixed to the coupling.

The method further includes the steps of: providing an implement having an adjustable shape; affixing the implement to the coupling such that the implement is extended to the distal end; selectively articulating the implement about the fulcrum axis relative to the refillable reservoir; providing an existing friction-reducing agent; and the refillable reservoir receiving and discharging the existing friction-inducing agent therefrom.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

Figure 1:
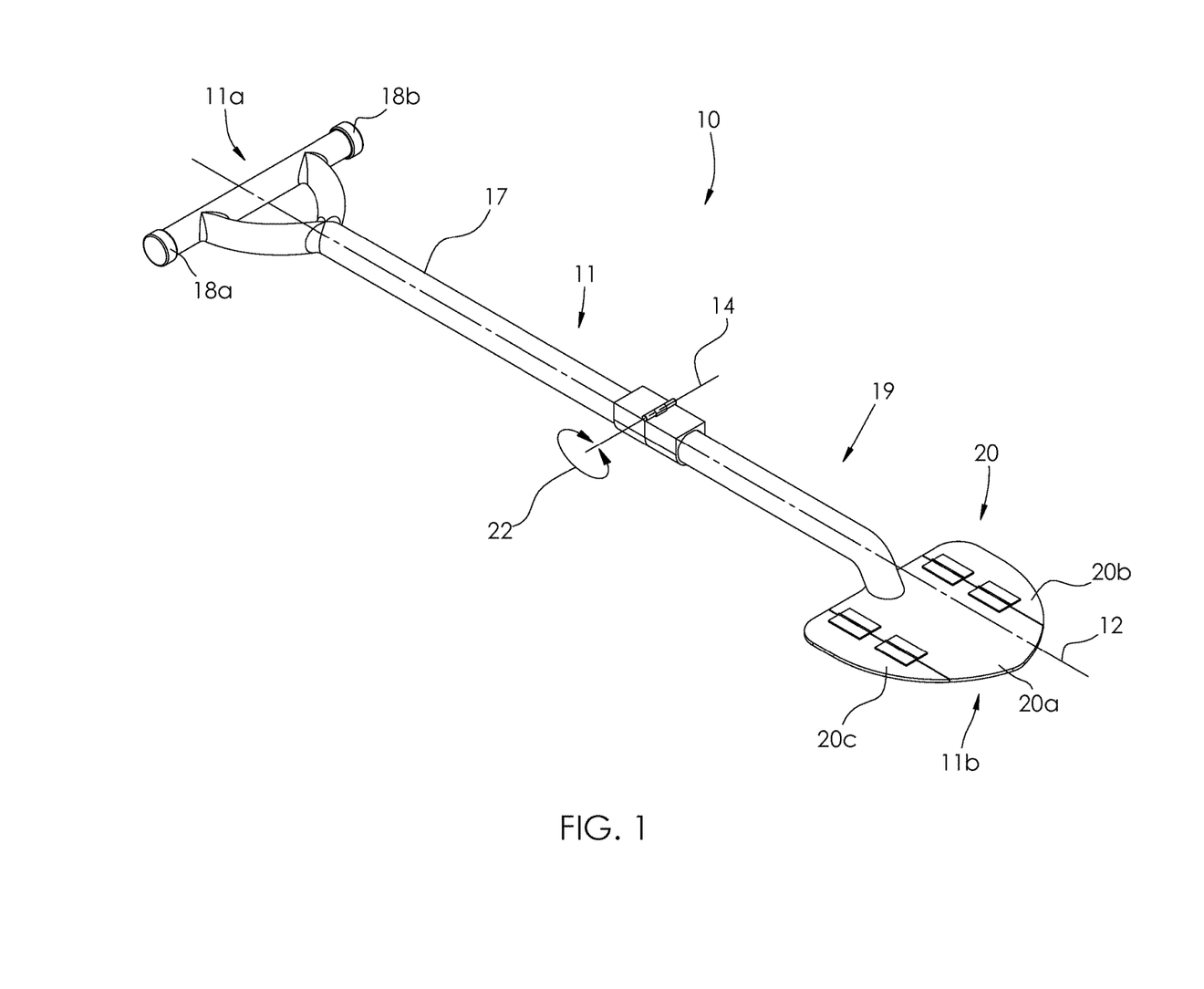
FIG. 1 is a perspective view illustrating a multi-functional folding shovel articulated to an unfolded position, in accordance with a non-limiting exemplary embodiment.
Figure 2:
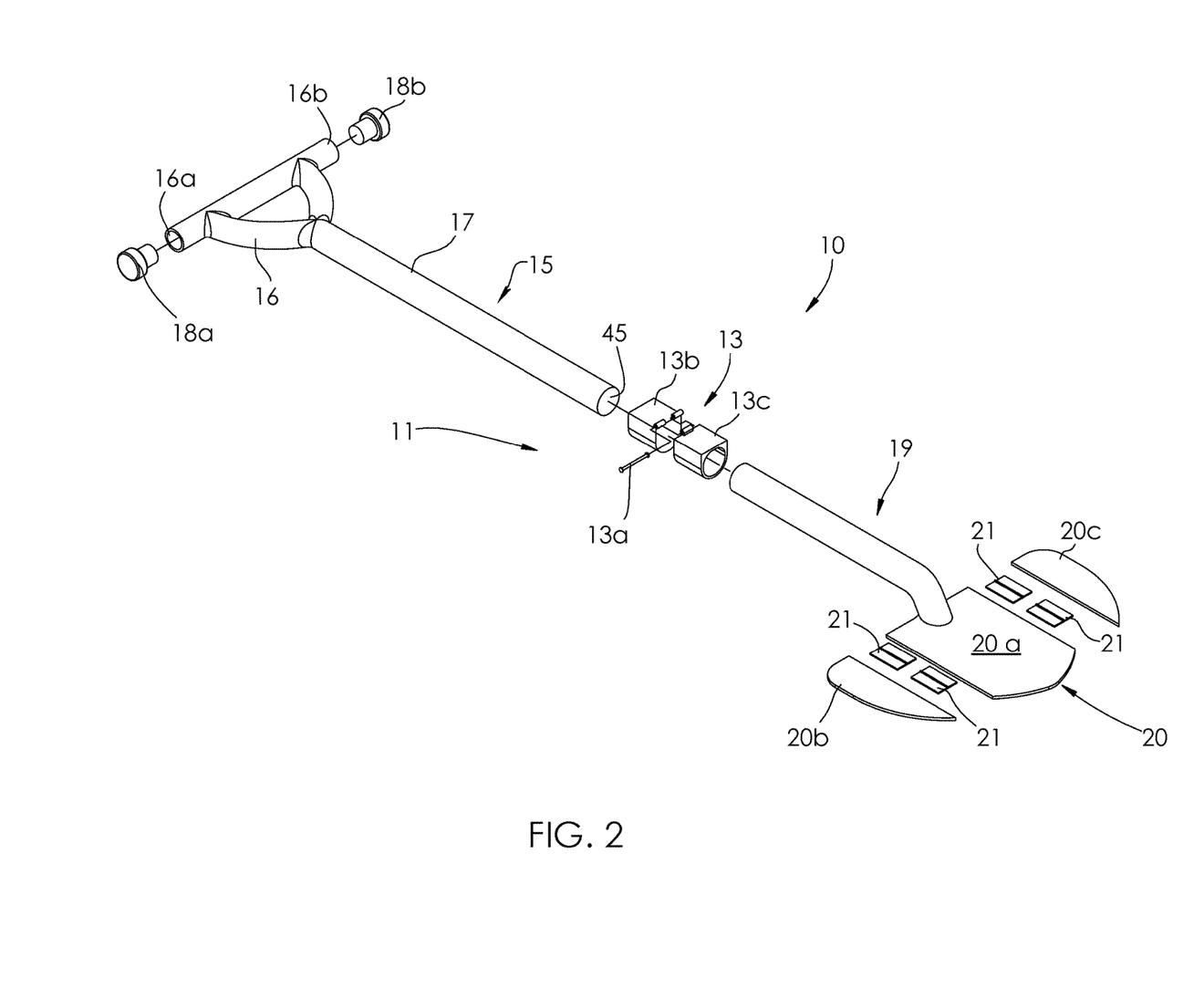
FIG. 2 is an exploded view of the multi-functional folding shovel shown in FIG. 1.
Figure 3:
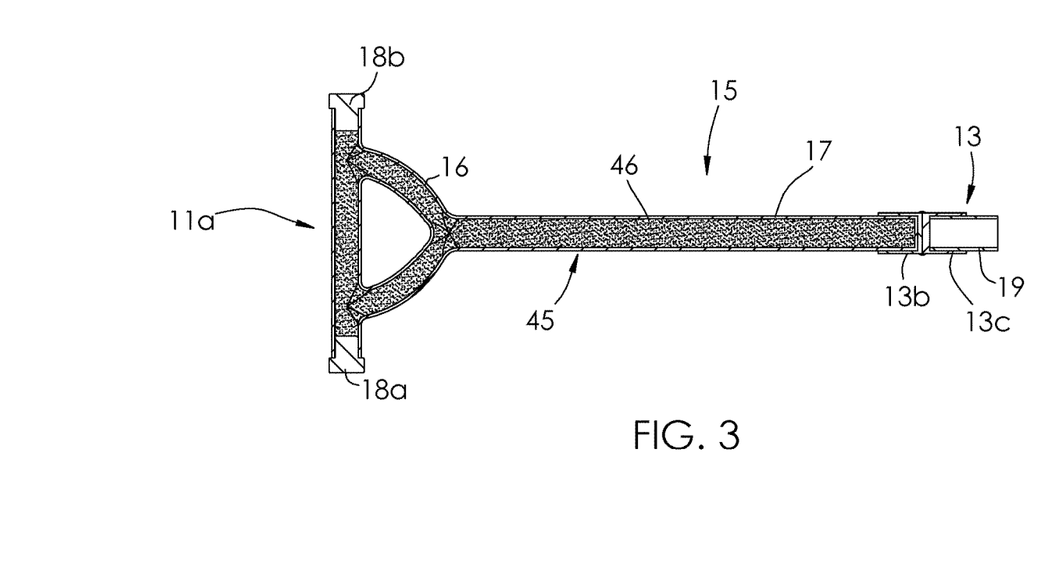
FIG. 3 is a cross-sectional view of the refillable reservoir taken along line 3-3 in FIG. 4.
Figure 4:
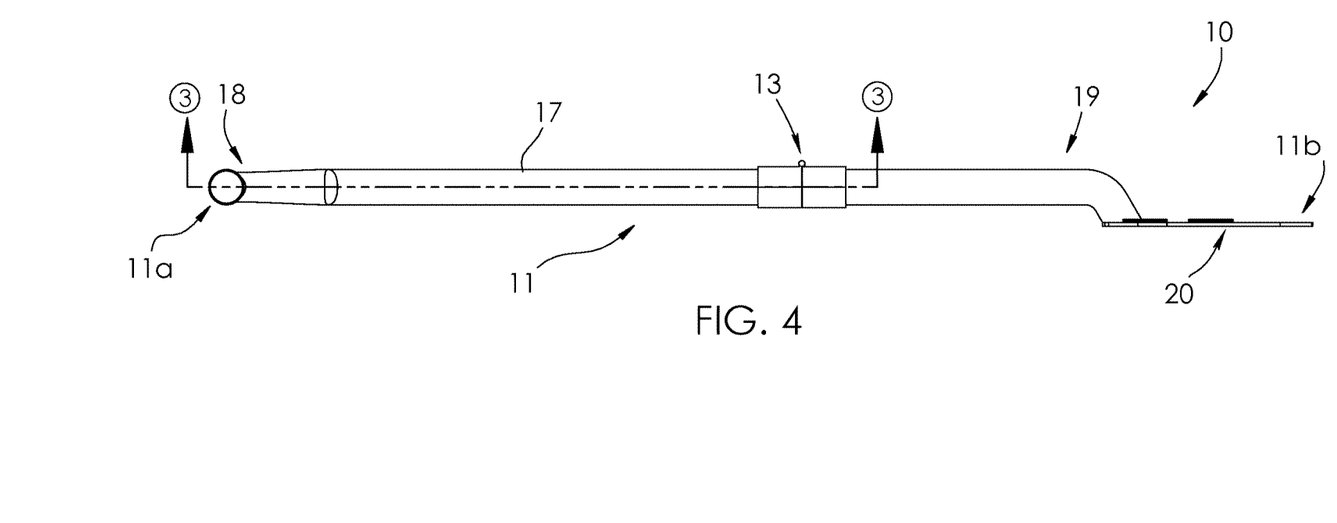
FIG. 4 is a side elevational view of the multi-functional folding shovel articulated to an unfolded position.
Figure 5:
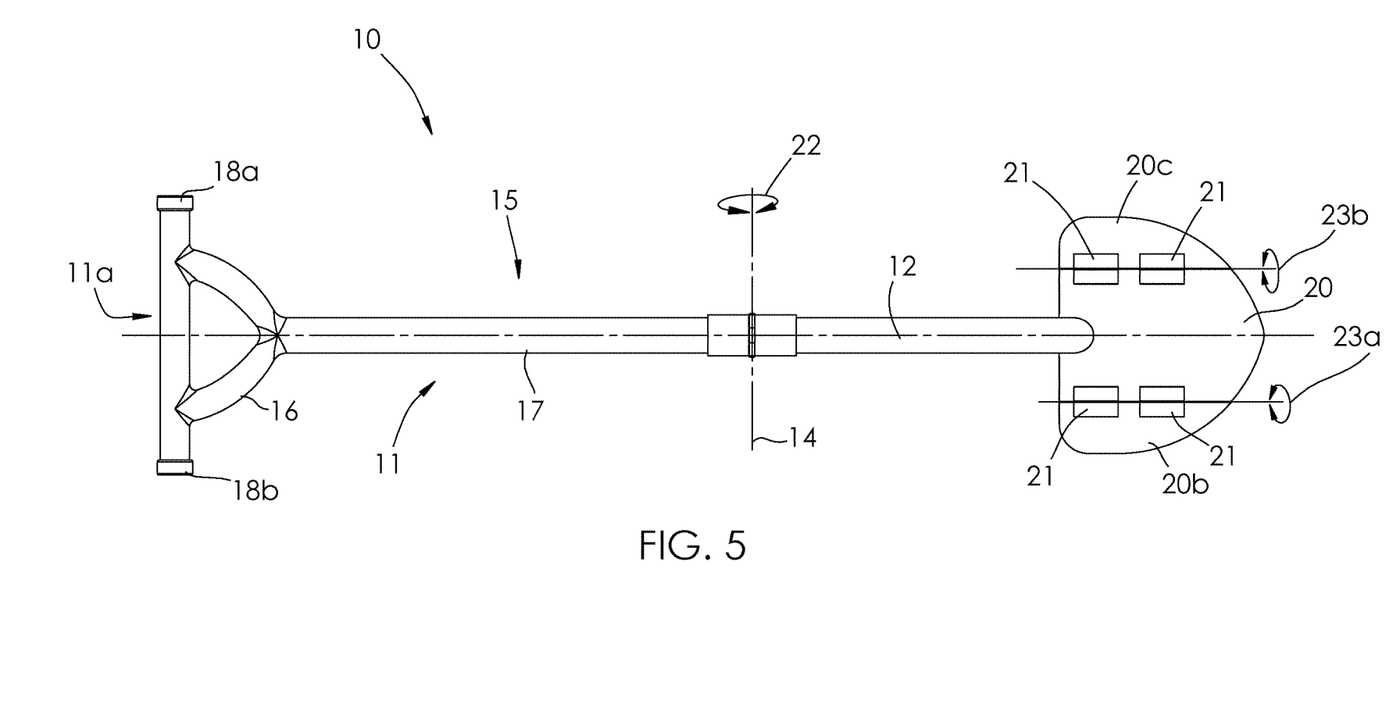
FIG. 5 is a top plan view illustrating the underside of the multifunctional folding shovel articulated to an unfolded position as shown in FIG. 1.
Figure 6:
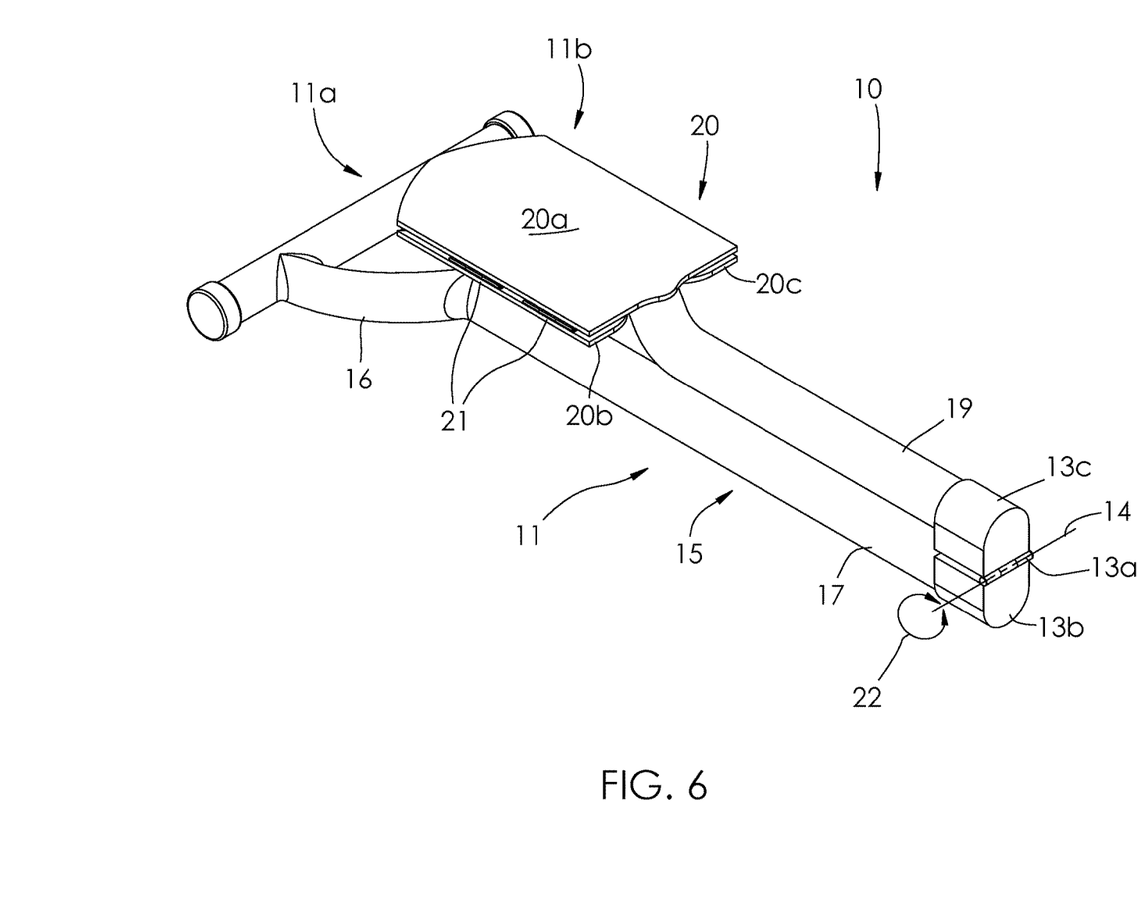
FIG. 6 is a perspective view illustrating the multi-functional folding shovel articulated to a folded position, in accordance with a non-limiting exemplary embodiment.
Figure 7:
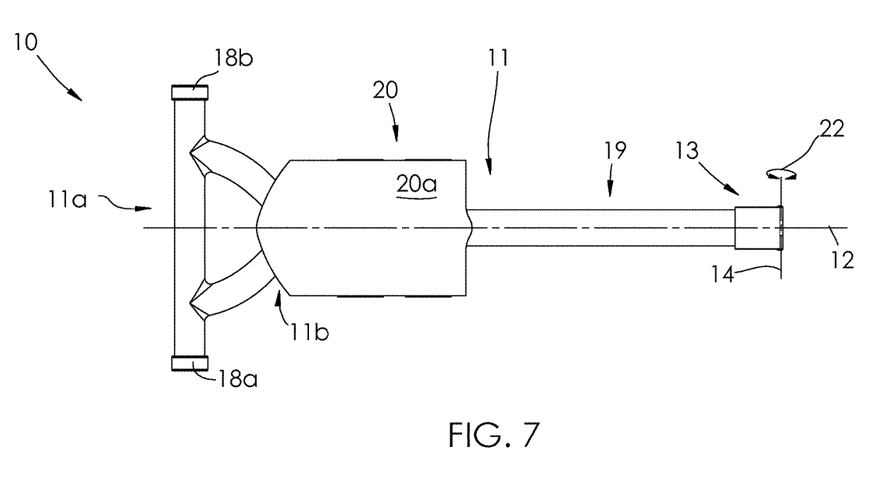
FIG. 7 is a top plan view of the multi-functional folding shovel articulated to a folded position as shown in FIG. 6.
Figure 8:
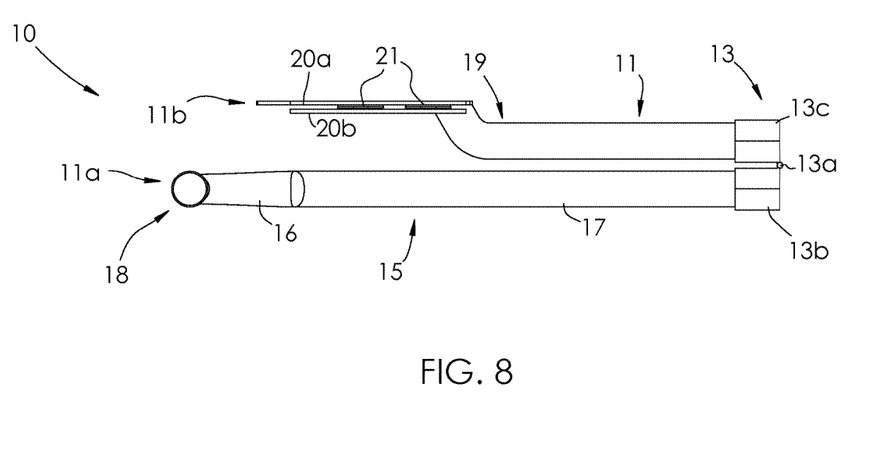
FIG. 8 is a side elevational view of the multi-functional folding shovel articulated to a folded position as shown in FIG. 7.

The non-limiting exemplary embodiment(s) is/are referred to generally in FIGS. 1-8 and is/are intended to provide a multi-functional folding shovel 10 for assisting a user to regain traction under vehicle wheels. The multi-functional folding shovel 10 includes a bifurcated body 11 having a centrally registered longitudinal axis 12 extended along an entire length of the body 11. Such a bifurcated body 11 includes a proximal end 11*a* and a distal end 11*b* opposed therefrom. A coupling 13 is intermediately disposed between the proximal end 11*a* and the distal end 11*b* wherein the coupling 13 has a fulcrum axis 14 registered orthogonal to the centrally registered longitudinal axis 12. Advantageously, a refillable reservoir 15 is extended from the proximal end 11*a* and affixed to the coupling 13. In this manner, refillable reservoir 15 is adapted to receive and discharge an existing friction-inducing agent 46 (e.g., sand) therefrom. An implement 19 having an adjustable shape is affixed to the coupling 13 and extended to the distal end 11b wherein the implement 19 is selectively articulated about the fulcrum axis 14 relative to the refillable reservoir 15. Such a structural configuration provides the unexpected and unpredictable advantage of efficiently storing and discharging an existing friction-inducing agent 46 from refillable reservoir 15 located at the upper portion of the bifurcated body 11 thereby aiding the user to succinctly regain traction under a vehicle drive-wheel without requiring large and heavy tools.

In a non-limiting exemplary embodiment, the refillable reservoir 15 includes a hollow tube 45 including a generally d-shaped handle portion 16 located at the proximal end 11a of the bifurcated body 11. A rectilinear portion 17 is in fluid communication with the handle portion 16. Notably, the rectilinear portion 17 is axially aligned with the centrally registered longitudinal axis 12 and engaged with the coupling 13. At least one end cap 18 is removably mated to the handle portion 16 for providing access to the existing friction-inducing agent 46. Such a structural configuration provides the unexpected and unpredictable advantage of ensuring a user can readily access and replenish the refillable reservoir 15, as needed.

In a non-limiting exemplary embodiment, the coupling 13 includes a hinge 13a including a first portion 13b directly and statically connected to the rectilinear portion 17. A second portion 13c is directly and statically connected to the implement 19. In this manner, the implement 19 is selectively articulated along an arcuate path 22 about the fulcrum axis 14 such that the implement 19 is disposed substantially parallel to the refillable reservoir 15 when biased (articulated) to a folded position (FIGS. 6-8) as well as an unfolded position (FIGS. 1-2, 4-5). Such a structural configuration provides the unexpected and unpredictable advantage of allowing the implement 19 to fold along the accurate path 22 during non-operating conditions and unfold during operating conditions without having to disassemble the proximal end 11a from the distal end 11b, and visa-versa.

In a non-limiting exemplary embodiment, the implement 19 includes a shovel 48.

In a non-limiting exemplary embodiment, the generally d-shaped handle portion 16 includes a first open port 16a and a second open port 16b axially opposed therefrom. Such a structural configuration provides the unexpected and unpredictable advantage of enabling the user to remove, store, and replenish the refillable reservoir 15 with different existing friction-inducing agents 46 in order to accommodate various terrains and conditions that may be encountered during travel.

In a non-limiting exemplary embodiment, at least one end cap 18 includes a first end cap 18a and a second end cap 18b detachably mated to the first open port 16a and the second open port 16b, respectively. Such a structural configuration provides the unexpected and unpredictable advantage of maintaining the existing friction-inducing agent 46 in the refillable reservoir 15. This can be especially useful when the multi-functional shovel 10 is stored in space-confined areas near other personal items.

In a non-limiting exemplary embodiment, the shovel 48 includes a blade 20 located at the distal end 11b of the body 11. Such a blade 20 advantageously includes a central section 20a aligned with the centrally registered longitudinal axis 12. A pair of coextensively shaped flanges 20b, 20c are pivotally connected (via hinges 21) to opposed lateral sides of the central section 20a. In this manner, each of the coextensively shaped flanges 20b, 20c are equidistantly offset from the centrally registered longitudinal axis 12. Notably, the coextensively shaped flanges 20b, 20c are articulated along mutually exclusive and non-overlapping travel paths 23a, 23b, respectively. Such a structural configuration provides the unexpected and unpredictable advantage of effectively and easily reducing a size of the blade 20 thereby minimizing damage to personal items near or around the multi-functional folding shovel 10.

The present disclosure further includes a method of utilizing a multi-functional folding shovel 10 for assisting a user to regain traction under vehicle wheels. Such a method includes the steps of: providing a bifurcated body 11 having a centrally registered longitudinal axis 12 extended along an entire length of the body 11, as well as a proximal end 11a and a distal end 11b opposed therefrom, by performing the sub-steps of: providing and intermediately disposing a coupling 13 between the proximal end 11a and the distal end 11b wherein the coupling 13 has a fulcrum axis 14 registered orthogonal to the centrally registered longitudinal axis 12; and providing and extending a refillable reservoir 15 from the proximal end 11a such that the refillable reservoir 15 is affixed to the coupling 13.

The method further includes the steps of: providing an implement 19 having an adjustable shape; affixing the implement 19 to the coupling 13 such that the implement 19 is extended to the distal end 11b; selectively articulating the implement 19 about the fulcrum axis 14 relative to the refillable reservoir 15; providing an existing friction-reducing agent 46; and the refillable reservoir 15 receiving and discharging the existing friction-inducing agent 46 therefrom.

Referring to the figures in general, in a non-limiting exemplary embodiment(s), the multi-functional shovel 10 is an emergency, do-it-yourself apparatus for freeing a car that has lost traction in snow, ice, or mud. The multi-functional shovel 10 includes a refillable reservoir 15 that supplies the user with high-traction sand or cat-litter that may be placed beneath and in front of the drive-wheels of the vehicle in order to regain traction.

In a non-limiting exemplary embodiment, the multi-functional shovel 10 may measure 46 to 50 inches in total length when extended and locked for use, with a tool-grade steel implement 19. The implement 19 may be spade-shaped and measure approximately 10 inches in length and 8 to 9 inches in width. The implement 19 is constructed of three panels (sections 20a, 20b, 20c) pivotally connected to each other to fold out and lock together. A medial end of implement 19 is mated to a pivotal coupling 13 (e.g., hinge joint). The coupling 13 will permit the user to fold the implement back 180 degrees—along arcuate travel path 22—from the extended position so that it lies back along and substantially parallel to the refillable reservoir 15; or to position implement 19 straight out at 180 degrees relative to the refillable reservoir 15; or to position the implement 19 at 90 degrees relative to the refillable reservoir 15, in the manner of a hoe.

The refillable reservoir 15 has a dual role, as it functions as a d-shaped handle 16 and storage reservoir for sand or cat-litter (e.g., agent 46). Thus, the refillable reservoir 15 can be fabricated in a stiff, strong, but lightweight and hollow fiberglass resin. The refillable reservoir 15 is preferably tubular, and more robust than those generally found on shovels. The top of the refillable reservoir 15 forms a generally d-shaped handle 16, and the top of the d-shaped handle 16 will have at least one opening (e.g., the first open port 16a and second open port 16b). Either end of the d-shaped handle 16 will be capped with a removable rubber caps (e.g., first end cap 18a and second end cap 18b). Removal of either end cap 18a, 18b will give access to the hollow tube 45—interior of the refillable reservoir 16. This refillable reservoir 16 will be pre-filled with the material of choice—which might be sand, cat-litter, or rock-salt (e.g., friction-inducing agent 46).

Non-limiting exemplary alternate embodiments may include a shovel 48 with variously sized blades 20, and a variety of d-handle/rectilinear portion dimensions (collectively refillable reservoir 15) designed to appeal to various users. A "trucker's" multi-functional shovel, for example, might feature a larger implement 19 and a shorter, more compact and robust refillable reservoir 15; and a "deep snow" multi-functional shovel might feature a square-end blade 20, and a refillable reservoir 15 filled with salt rather than sand. Other variations might include a "camper's" multi-functional shovel, a "compact car" multi-functional shovel and so forth.

The great design advantage of the multi-functional shovel 10 is its combination of two components into a single, self-contained and refillable device. When a motor vehicle loses traction and becomes stuck in snow or mud, a shovel alone may not suffice—because the tires will still require traction in order to move the vehicle. With the multi-functional shovel 10, the bifurcated body 11 provides the necessary friction inducing material such as sand, cat-litter, or rock salt that the user will put down ahead of and beneath the tires once they've been dug out. And because the multi-functional shovel 10 has been designed to be refillable, the motorist would simply use the shovel and traction material as needed, and refill the reservoir 15 between uses. Compact and sturdy, the multi-functional shovel 10 can be used as an emergency equipment for any motorist who might encounter snowy or muddy conditions in the course of travel.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A multi-functional folding shovel for assisting a user to regain traction under vehicle wheels, said multi-functional folding shovel comprising: a bifurcated body having a centrally registered longitudinal axis extended along an entire length thereof, said bifurcated body including
    a proximal end and a distal end opposed therefrom;
    a coupling intermediately disposed between said proximal end and said distal end, said coupling having a fulcrum axis registered orthogonal to the centrally registered longitudinal axis;
    a refillable reservoir extended from said proximal end and affixed to said coupling, said refillable reservoir adapted to receive and discharge an existing friction-inducing agent therefrom;
    an implement affixed to said coupling and extended to said distal end; wherein said implement is selectively articulated about the fulcrum axis relative to said refillable reservoir;
    wherein said refillable reservoir comprises a hollow tube including a generally d-shaped handle portion located at said proximal end of said bifurcated body, a rectilinear portion in fluid communication with said handle portion, wherein said rectilinear portion being axially aligned with the centrally registered longitudinal axis and engaged with said coupling;
    at least one end cap removably mated to said handle portion for providing access to the existing friction-inducing agent;
    wherein said coupling comprises a hinge including a first portion directly and statically connected to said rectilinear portion; and a second portion directly and statically connected to said implement; and
    wherein said implement is selectively articulated along an arcuate path about the fulcrum axis such that said implement is disposed substantially parallel to said refillable reservoir when biased to a folded position as well as an unfolded position.

2. The multi-functional folding shovel of claim 1, wherein said implement comprises: a shovel.

3. The multi-functional folding shovel of claim 2, wherein said generally d-shaped handle portion comprises: a first open port and a second open port axially opposed therefrom.

4. The multi-functional folding shovel of claim 3, wherein said at least one end cap includes a first end cap and a second end cap detachably mated to said first open port and said second open port, respectively.

5. The multi-functional folding shovel of claim 4, wherein said shovel comprises: a blade located at said distal end of said body, said blade including
    a central section aligned with the centrally registered longitudinal axis; and
    a pair of coextensively shaped flanges pivotally connected to opposed lateral sides of said central section;
    wherein each of said coextensively shaped flanges are equidistantly offset from the centrally registered longitudinal axis;
    wherein said coextensively shaped flanges are articulated along mutually exclusive and non-overlapping travel paths.

6. A multi-functional folding shovel for assisting a user to regain traction under vehicle wheels, said multi-functional folding shovel comprising: a bifurcated body having a centrally registered longitudinal axis extended along an entire length thereof, said bifurcated body including
 a proximal end and a distal end opposed therefrom;
 a coupling intermediately disposed between said proximal end and said distal end, said coupling having a fulcrum axis registered orthogonal to the centrally registered longitudinal axis; a refillable reservoir extended from said proximal end and affixed to said coupling, said refillable reservoir adapted to receive and discharge an existing friction-inducing agent therefrom;
 an implement affixed to said coupling and extended to said distal end; wherein said implement is selectively articulated about the fulcrum axis relative to said refillable reservoir;
 wherein said implement has an adjustable shape;
 wherein said refillable reservoir comprises a hollow tube including a generally d-shaped handle portion located at said proximal end of said bifurcated body; a rectilinear portion in fluid communication with said handle portion, wherein said rectilinear portion being axially aligned with the centrally registered longitudinal axis and engaged with said coupling;
 at least one end cap removably mated to said handle portion for providing access to the existing friction-inducing agent;
 wherein said coupling comprises a hinge including
 a first portion directly and statically connected to said rectilinear portion; and a second portion directly and statically connected to said implement; wherein said implement is selectively articulated along an arcuate path about the fulcrum axis such that said implement is disposed substantially parallel to said refillable reservoir when biased to a folded position as well as an unfolded position.

7. The multi-functional folding shovel of claim 6, wherein said implement comprises: a shovel.

8. The multi-functional folding shovel of claim 7, wherein said generally d-shaped handle portion comprises: a first open port and a second open port axially opposed therefrom.

9. The multi-functional folding shovel of claim 8, wherein said at least one end cap includes a first end cap and a second end cap detachably mated to said first open port and said second open port, respectively.

10. The multi-functional folding shovel of claim 9, wherein said shovel comprises: a blade located at said distal end of said body, said blade including
 a central section aligned with the centrally registered longitudinal axis; and
 a pair of coextensively shaped flanges pivotally connected to opposed lateral sides of said central section;
 wherein each of said coextensively shaped flanges are equidistantly offset from the centrally registered longitudinal axis;
 wherein said coextensively shaped flanges are articulated along mutually exclusive and non-overlapping travel paths.

* * * * *